(12) United States Patent
Hasegawa

(10) Patent No.: US 7,800,850 B2
(45) Date of Patent: Sep. 21, 2010

(54) LENS DRIVING DEVICE, LENS BARREL, OPTICAL APPARATUS, AND METHOD FOR ASSEMBLING LENS DRIVING DEVICE

(75) Inventor: Tomoki Hasegawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/364,999

(22) Filed: Feb. 3, 2009

(65) Prior Publication Data

US 2009/0219635 A1 Sep. 3, 2009

(30) Foreign Application Priority Data

Feb. 29, 2008 (JP) .............................. 2008-050125

(51) Int. Cl.
*G02B 7/02* (2006.01)
(52) U.S. Cl. .................. 359/822; 359/811; 359/819
(58) Field of Classification Search ................. 359/811, 359/813, 818, 819–824
See application file for complete search history.

(56) References Cited

U.S. PATENT DOCUMENTS 5,150,260 A * 9/1992 Chigira ........................ 359/694
6,134,057 A * 10/2000 Ueyama et al. ............. 359/821

FOREIGN PATENT DOCUMENTS

| JP | 6-174992 A | 6/1994 |
| JP | 8-248284 A | 9/1996 |
| JP | 2006-091455 A | 2/2006 |

* cited by examiner

*Primary Examiner*—Mohammed Hasan
(74) *Attorney, Agent, or Firm*—Canon U.S.A., Inc. I.P. Division

(57) ABSTRACT

A lens driving device is provided that moves a lens support frame in an optical-axis direction through a rack engaging with a feed screw functioning as an output shaft of a driving unit. The rack includes a main rack tooth engaging with the feed screw and a pressing portion facing and elastically holding the feed screw through an urging portion. The pressing portion includes a guiding section for guiding a pressing tooth of the pressing portion to a predetermined regular engagement position in incorporating the feed screw even when the pressing tooth facing and holding the feed screw in the rack of the lens driving device is inclined inward.

8 Claims, 12 Drawing Sheets

LENS DRIVING DEVICE, LENS BARREL, OPTICAL APPARATUS, AND METHOD FOR ASSEMBLING LENS DRIVING DEVICE

BACKGROUND OF THE INVENTION

1. Field of the Invention

The present invention relates to a lens driving device for moving a lens supporting member that supports a lens along an optical-axis direction.

A lens driving device according to the present invention can be used in an image pickup apparatus serving as an optical apparatus, such as a camcorder or a digital camera.

2. Description of the Related Art

Japanese Patent Laid-Open No. 5-27149 describes a lens driving device that includes a coil spring (hereinafter referred to as a rack spring) serving as one urging portion and having the function of reducing looseness of both engagement with a lead screw (feed screw) of a rack and attachment to a lens support.

Japanese Patent Laid-Open No. 8-248284 describes a lens driving device that includes a lens barrel having substantially the same fundamental configuration as in the above patent document.

However, the lens driving device has a pressing portion that faces a tooth-shaped portion (hereinafter referred to as a main rack tooth) engaging with the feed screw of the rack and that holds the feed screw. The pressing portion includes a projection having a triangular shape in cross section (hereinafter referred to as a pressing tooth).

Japanese Patent Laid-Open No. 6-174992 describes a lens driving device in which a pressing portion of a rack is arranged not in parallel to but at a predetermined angle to a facing main rack tooth to apply an urging force to a lens support in a particular direction.

The pressing portion of the rack in the traditional lens driving device described in any of the above patent documents has elasticity, and is inclined inward by the action of a load from the rack spring in a state before the feed screw is incorporated into the rack.

However, in the traditional lens driving device, the positional relationship between the main rack tooth and the pressing tooth does not match an optimal position for engagement with the feed screw in a state where incorporation of the feed screw into the rack has been completed.

Thus, in a state where the pressing tooth is inclined inward, when the feed screw starts engaging, a displacement is present in the positional relationship between the main rack tooth and the pressing tooth.

That is, when the main rack tooth and the pressing tooth start engaging with the feed screw in incorporating the feed screw from an opening side of the rack, a position displacement is caused in the pressing tooth by the inclination.

Therefore, the pressing tooth may enter a root of the feed screw adjacent to a correct root with which the pressing tooth should engage.

The base of the pressing portion including the pressing tooth is thin to minimize rigidity and have elasticity. Thus, when the pressing tooth is guided to such an incorrect adjacent root of the screw, a problem arises in which the pressing portion being warped incorrectly engages in the adjacent root.

FIGS. 10A to 10E illustrate, in a cross section of a lens driving device, a process for incorporating a feed screw $8a$ into a rack 18.

For the sake of illustration of a pressing portion 18$g$, a part of the rack 18 that is in front of the pressing portion 18$g$ is not illustrated in the drawings.

FIGS. 9A and 9B illustrate a traditional rack. FIG. 9A illustrates the rack from an opening side; FIG. 9B is a perspective view thereof.

The rack 18 includes a pressing tooth 18$b$ and a main rack tooth 18$a$.

FIG. 10A illustrates a state before the feed screw $8a$ is incorporated. In this state, the pressing tooth 18$b$ of the pressing portion 18$g$ is inclined inward by a load of a rack spring 17$a$.

FIG. 10E illustrates a state where the incorporation of the feed screw $8a$ has been completed.

The angle of the engagement portion between the main rack tooth and the pressing tooth illustrated in FIG. 10E in the state where the incorporation has been completed is represented by C. The angle of the engagement portion between the main rack tooth and the pressing tooth illustrated in FIG. 10C in a state where the main rack tooth and the pressing tooth start engaging in an incorporating process is represented by B.

The amount of displacement from a root of the feed screw $8a$ with which the pressing tooth should engage in FIG. 10C is (B−C)/360×screw lead L. When this amount of displacement is equal to or larger than one-half of the screw pitch, the pressing tooth tends to be guided into an adjacent root.

For example, when B is 255°, C is 150°, and L is 0.6 mm (double screw with a pitch of 0.3 mm), the amount of displacement is 0.175 mm. Because this amount of displacement is larger than 0.15 mm, which is one-half of the screw pitch 0.3 mm, the pressing tooth tends to enter a root of the feed screw $8a$ adjacent to a correct root with which the pressing tooth should engage.

In particular, when the lead of the feed screw $8a$ is large, the previously described displacement in a state where the pressing portion 18$g$ is inclined is large, and this may lead to incorrect engagement.

Similarly, when the angle of the pressing portion (angle θ in FIG. 5) for applying an urging force to the lens support is large, as in the lens driving device described in the second patent document (Japanese Patent Laid-Open No. 8-248284), the above described displacement in the state where the pressing portion 18$g$ is inclined is large, and this results in the occurrence of incorrect engagement.

When a driving unit i.e., a motor unit including the feed screw $8a$ is incorporated, an inner engagement state cannot be observed. Thus, incorrect engagement cannot be checked after the screw is incorporated, and the incorrect engagement may be present in a back-end process.

In a state where the pressing tooth is incorrectly engaged, the urging force of the rack to the feed screw is reduced, and this may lead to a malfunction caused by looseness of engagement.

SUMMARY OF THE INVENTION

The present invention provides a lens driving device that has an improved ease of incorporation achieved by a rack whose form is set so as to be able to prevent a pressing tooth of the rack from being incorrectly engaged and that can prevent occurrence of a defective caused by the incorrect engagement.

According to an aspect of the present invention, a lens driving device includes a lens supporting portion configured to support a lens, a driving unit including a feed screw configured to transfer a driving force for driving the lens supporting portion in an optical-axis direction, and a rack supported by the lens supporting portion and engaging with the feed screw. The rack includes a rack portion and a pressing portion facing the rack portion, the rack portion has a plurality of teeth engaging with the feed screw, and the pressing portion has a pressing tooth elastically holding the feed screw. At least one of the pressing portion and the rack portion has a guiding section for guiding the pressing tooth to a predetermined engagement position of the feed screw.

The pressing portion may preferably have the guiding section.

The guiding section may preferably be a guiding tooth disposed at a surface that does not face the feed screw in a state where the guiding tooth engages with the feed screw.

The guiding section and the pressing tooth may preferably be continuous with each other.

The guiding section may preferably be a slope adjacent to the pressing tooth at a surface that does not face the feed screw in a state where the guiding section engages with the feed screw.

According to another aspect of the present invention, a lens barrel includes the lens driving device and the lens described above.

According to another aspect of the present invention, an optical apparatus includes the above-described lens barrel.

According to another aspect of the present invention, a method for assembling the above-described lens driving device includes, in incorporating the feed screw into the rack while pressing the feed screw against the pressing portion, guiding the pressing tooth to a predetermined engagement position of the feed screw using the guiding section.

The present invention can provide a lens driving device capable of preventing incorrect engagement in incorporating a feed screw into a rack and thus occurrence of a defective caused by the incorrect engagement.

Further features of the present invention will become apparent from the following description of exemplary embodiments (with reference to the attached drawings).

DESCRIPTION OF THE EMBODIMENTS

Embodiments of the present invention are described below with reference to the drawings.

First, a fundamental configuration of a lens barrel being the first embodiment of the present invention is described with reference to FIGS. 1 and 2.

Figure 1:
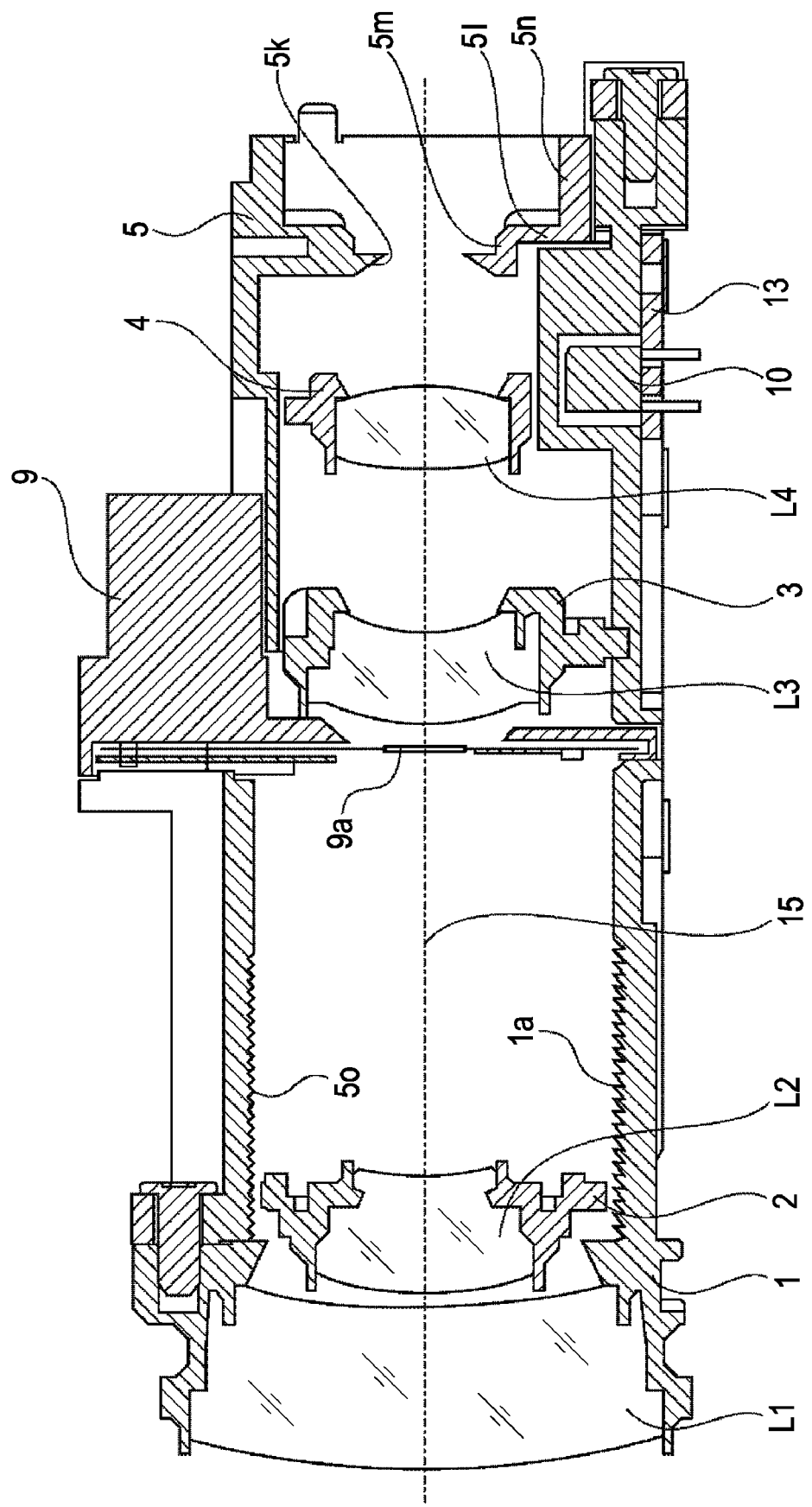
FIG. 1 is a cross-sectional view of a lens barrel according to an embodiment of the present invention.

FIG. 1 illustrates a vertical section of the lens barrel. FIG. 2 illustrates an exploded view of the lens barrel.

An optical axis 15 passes through the lens barrel.

A first lens unit L1 is disposed at a side closest to an object. A second lens unit L2 moves along the optical-axis direction to zoom in or out.

A third lens unit L3 is a fixed lens unit. A fourth lens unit L4 corrects a focal plane variation occurring in zooming and performs focusing by moving along the optical-axis direction.

A first lens barrel section 1 supports the first lens unit L1 and includes a portion for supporting the first lens unit L1 at its front end and a box-shaped portion behind it.

The box-shaped portion has an opening that faces in a direction perpendicular to the optical axis (upward in FIG. 2) and an opening that faces rearward.

The first lens barrel section 1 includes a light-shielding line 1a at its bottom surface to suppress reflection of light at the bottom surface and thus prevent formation of a ghost.

A rear barrel section 5 has a semicircular upper cover including an opening that faces in a direction perpendicular to the optical axis (downward in FIG. 2) and an opening that faces frontward.

As illustrated in FIG. 1, the upper cover has a light-shielding line 5o at its ceiling surface to suppress reflection of light at the ceiling surface and thus prevent formation of a ghost.

The rear barrel section 5 (upper cover) includes a rear-end wall 5l at its rear end.

The rear-end wall 5l includes a filter support 5m supporting an optical low-pass filter and an image-sensor support 5n supporting an image sensor, such as a charge-coupled device (CCD) sensor or a complementary metal-oxide semiconductor (CMOS) sensor.

The rear barrel section 5 further includes a light-shielding portion 5k for preventing entry of unnecessary light into the optical low-pass filter and the image sensor.

Guide bars 6a and 6b extend in parallel to the optical axis. Each of the guide bars 6a and 6b has opposite ends supported by the first lens barrel section 1 and the rear barrel section 5 and serves as a guide.

In embodiments of the present invention, "parallel to the optical axis" includes not only a case in which it is exactly parallel but also a case in which, although it is not exactly parallel, non-parallelism is within tolerance and it is considered to be parallel.

The same applies to "perpendicular to the optical axis."

The guide bar 6a, which serves as a guide, is engaged with a sleeve of a second lens support frame 2 supporting the second lens unit L2 and a U-shaped ditch of a fourth lens support frame 4 supporting the fourth lens unit L4 so as to allow the second lens support frame 2 and the fourth lens support frame 4 to move therealong.

The guide bar 6b is engaged with a U-shaped ditch 2c (see, for example, FIG. 4) of the second lens support frame 2 serving as a movable lens supporting portion and a sleeve of the fourth lens support frame 4 so as to allow the second lens support frame 2 and the fourth lens support frame 4 to move therealong.

The second lens support frame 2, which serves as a movable lens supporting portion, is guided by the guide bar 6a along the optical-axis direction. The rotation of the second lens support frame 2 around the guide bar 6a is prevented by engagement between the guide bar 6b and the U-shaped ditch 2c.

The second lens support frame 2, which serves as a movable lens supporting portion, is attached to a rack 18 such that the rack 18 is freely rotatable within a plane perpendicular to the optical axis. The rack 18 is engaged with a screw shaft (feed screw) 8a serving as an output shaft for transferring a driving force from a zoom motor 8.

The zoom motor 8 includes the feed screw functioning as the output shaft for transferring a driving force.

Thus, when the zoom motor 8 is actuated and the screw shaft 8a is rotated, the second lens support frame 2 is driven in the optical-axis direction.

The rack 18 is elastically urged toward an end face in the optical-axis direction of the second lens support frame 2 and is elastically urged in a direction in which the rack 18 is engaged with the screw shaft 8a as the feed screw by a rack spring (urging portion) 17.

This reduces looseness among the second lens support frame 2, the rack 18, and the screw shaft 8a.

Tilting (inclining) of the second lens support frame 2 (second lens unit L2) to the optical-axis direction is prevented by engagement of the sleeve having a sufficient length with the guide bar 6a.

The fourth lens support frame 4 is guided along the optical-axis direction by the guide bar 6b, which serves as a guide, and is prevented from rotating around the guide bar 6b by the engagement between the guide bar 6a and the U-shaped ditch.

The fourth lens support frame 4 is attached to a rack 12 such that the rack 12 is rotatable within a plane perpendicular to the optical axis.

The rack 12 is engaged with a screw shaft (feed screw) 7a of a focus motor 7.

Thus, when the focus motor 7 is actuated and the screw shaft 7a is rotated, the fourth lens support frame 4 is driven in the optical-axis direction.

The rack 12 is elastically urged toward an end face in the optical-axis direction of the fourth lens support frame 4 and is elastically urged in a direction in which the rack 12 is engaged with the screw shaft 7a by a rack spring (urging portion) 16.

This reduces looseness among the fourth lens support frame 4, the rack 12, and the screw shaft 7a.

Tilting (inclining) of the fourth lens support frame 4 (fourth lens unit L4) to the optical-axis direction is prevented by engagement of the sleeve having a sufficient length with the guide bar 6b.

The third lens unit L3 is supported by a third lens support frame 3.

The third lens support frame 3 includes a datum point defining hole used to engage the guide bar 6a, which serves as a guide, and a rotation stopping hole (elongated hole) used to engage the guide bar 6b.

The engagement between these holes and the guide bars 6a and 6b enables the third lens support frame 3, i.e., the third lens unit L3 to be aligned with the optical axis.

The third lens support frame 3 is disposed between the second lens support frame 2 and the fourth lens support frame 4. Thus, it is difficult for the third lens support frame 3 to have a long length of engagement with the guide bar 6a.

To address this, in the present embodiment, the third lens support frame 3 has engagement portions used to engage the first lens barrel section 1 at three locations in a circumferential direction thereof. These engagement portions prevent tilting (inclining) of the third lens support frame 3 (third lens unit L3) to the optical-axis direction.

Each of the focus motor 7 and the zoom motor 8 can be a stepping motor, for example.

The focus motor 7 and the zoom motor 8 are supported by a motor support plate 7b and a motor support plate 8b, respectively, and are fixed to the first lens barrel section 1 by screws (not shown). Each of the motor support plates 7b and 8b is made of a metal sheet.

A light-quantity adjusting unit 9 is fixed to the rear barrel section 5 by a screw (not shown). The light-quantity adjusting unit 9 adjusts the quantity of light by opening or closing an aperture blade 9a and thus changing the diameter of an aperture through which the light passes.

Photo-interrupters 10 and 11 are bonded to reinforcing boards 13 and 14, respectively. The photo-interrupters 10 and 11 are fixed to the first lens barrel section 1 by screws (not shown) with the reinforcing boards 13 and 14 disposed therebetween, respectively.

The photo-interrupters 10 and 11 are switched between a light-shielding state and a light-receiving state by the fourth lens support frame 4 and the second lens support frame 2, respectively, moving along the optical-axis direction so as to make the light-shielding portions thereof enter or exit between light-emitting sections and light-receiving sections of the photo-interrupters 10 and 11.

Detecting the switching of the photo-interrupters 10 and 11 enables detection of whether each of the fourth lens support frame 4 and the second lens support frame 2 is at the datum point.

The second lens support frame 2 includes a light shielding portion 2a.

The fourth lens support frame 4 also includes a light-shielding portion, although not illustrated, which is similar to the light shielding portion 2a.

The focus motor 7, the zoom motor 8, the light-quantity adjusting unit 9, and the photo-interrupters 10 and 11 are soldered to a flexible printed circuit (FPC) (not shown), and they perform electrical signal communication with a main body of a camera through the FPC.

A detailed configuration of the lens driving device in the lens barrel according to the present embodiment will now be described next using a driving device for the second lens support frame 2 as an example.

Figure 3:
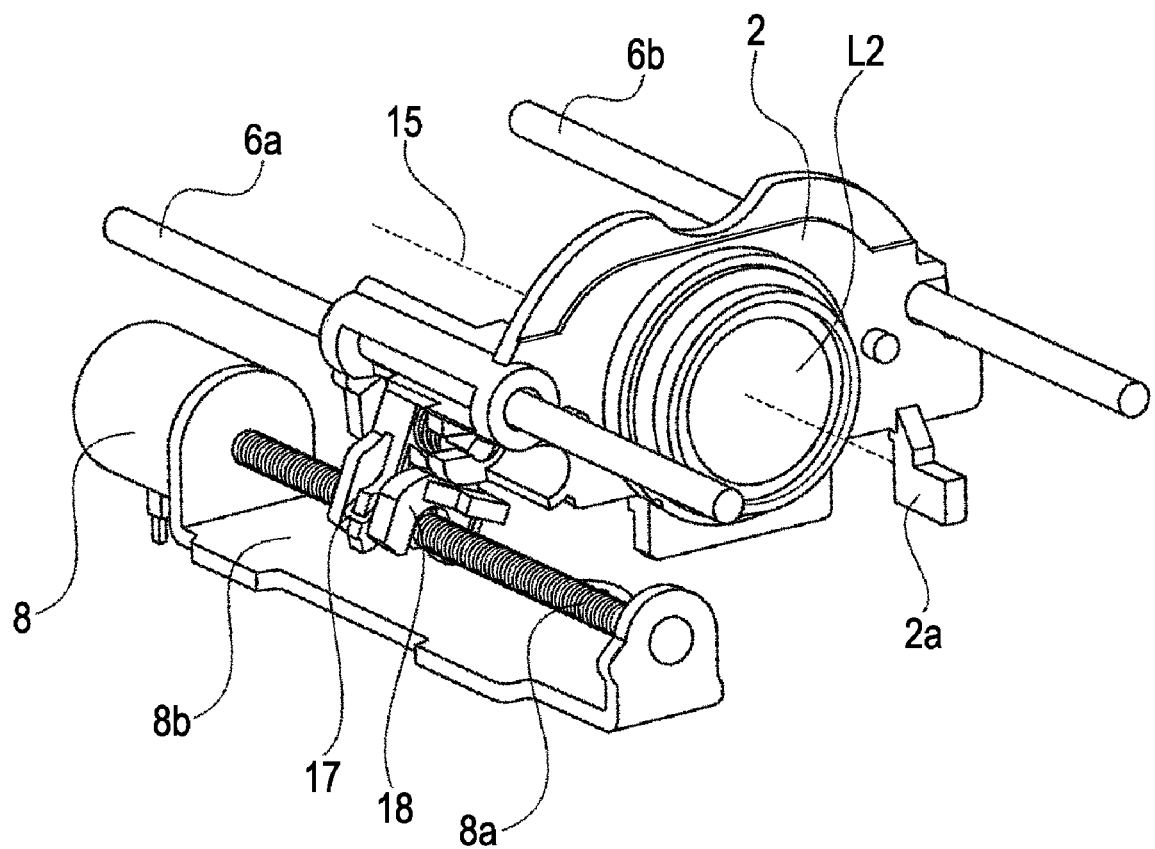
FIG. 3 is a perspective view of a lens driving device according to an embodiment of the present invention.
Figure 4:
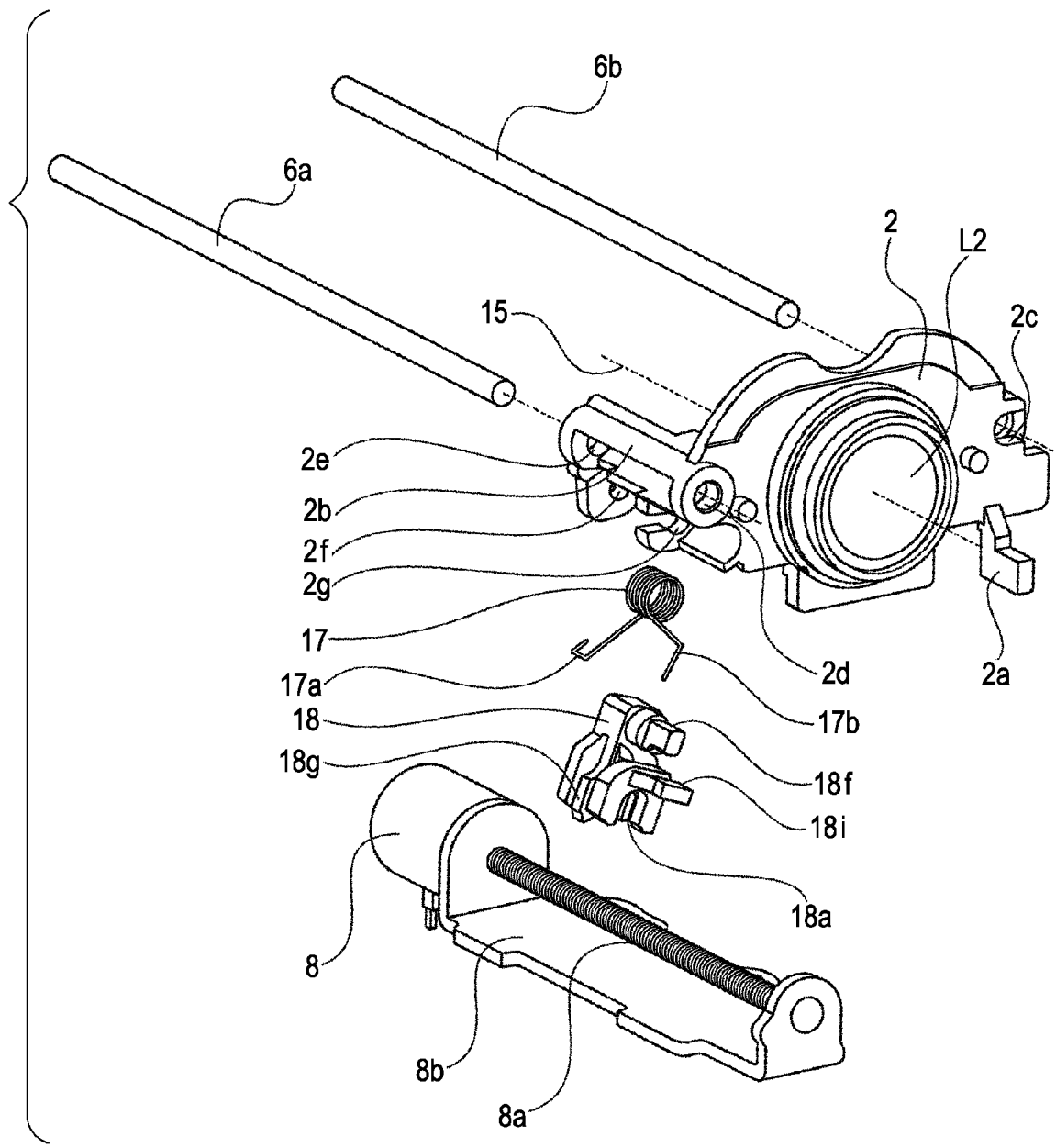
FIG. 4 is an exploded perspective view of the lens driving device according to an embodiment of the present invention.
Figure 5:
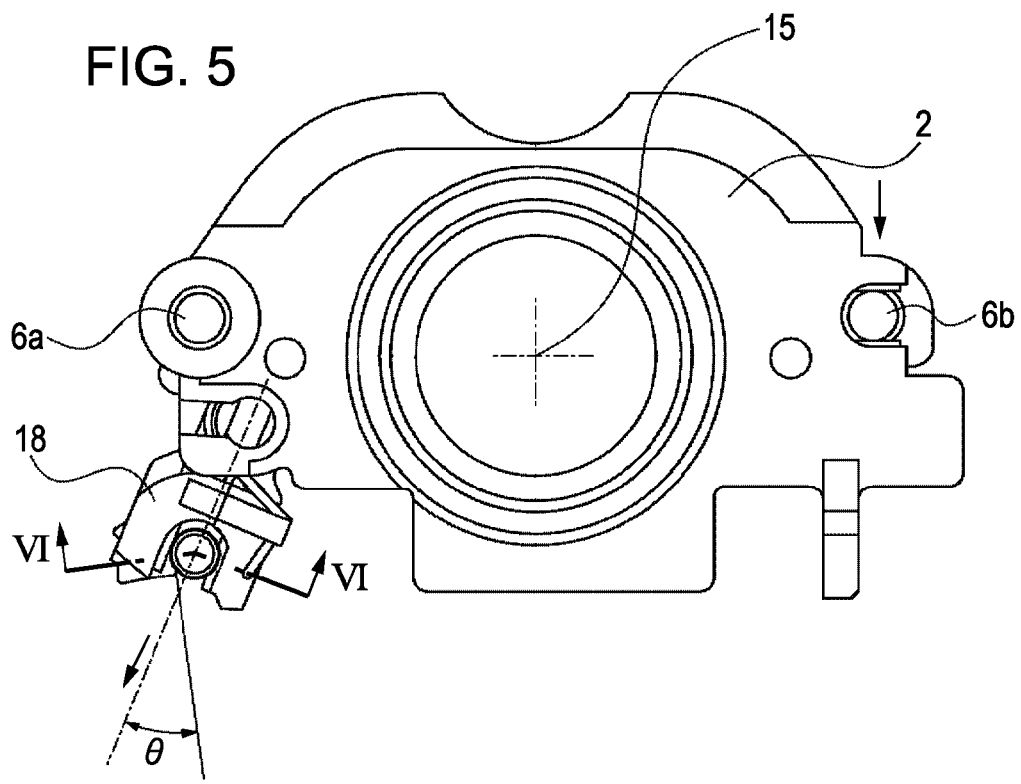
FIG. 5 is a front view of the lens driving device according to an embodiment of the present invention.
Figure 6:
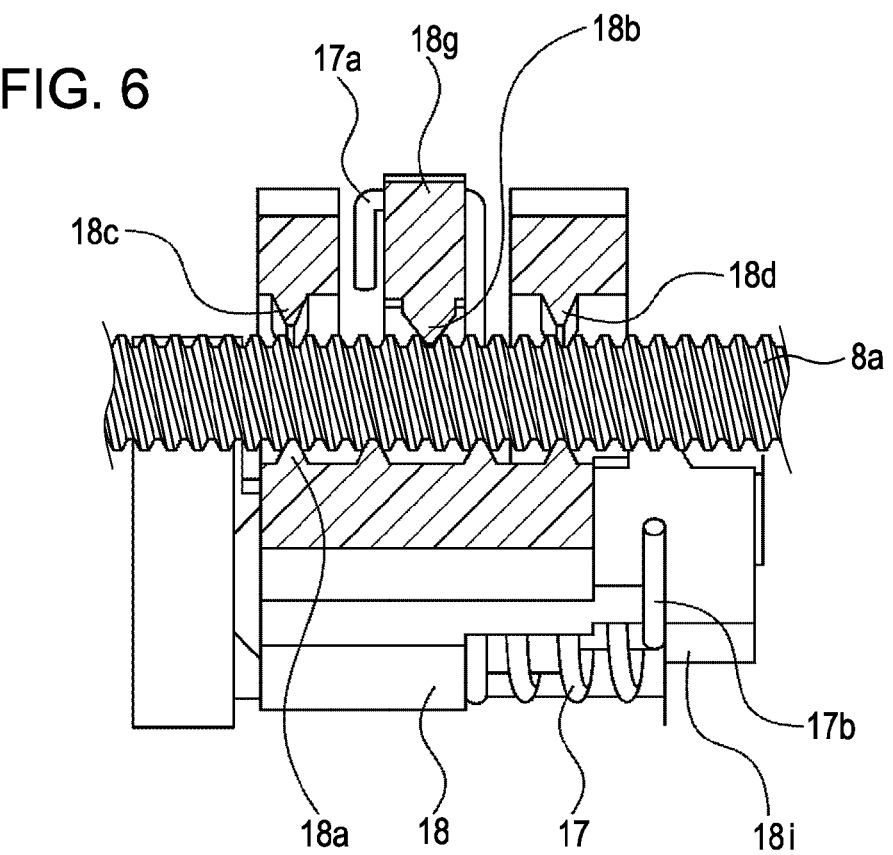
FIG. 6 illustrates engagement between a rack and a feed screw in the lens driving device according to an embodiment of the present invention.

FIG. 3 illustrates a perspective view of the driving device; FIG. 4 is an exploded perspective view thereof; FIG. 5 illustrates a front view thereof (with the motor and the motor support plate being not illustrated); and FIG. 6 illustrates an engagement state between the rack and the feed screw and a cross-sectional view taken along the line VI-VI of FIG. 5.

The guide bars 6a and 6b are disposed in parallel to the above-described optical axis.

The second lens support frame 2 includes a sleeve 2b. The second lens support frame 2 includes sleeve holes 2d and 2e used to engage the guide bar 6a at its both ends.

The second lens support frame 2 further includes the U-shaped ditch 2c used to engage the guide bar 6b.

The second lens support frame 2 also includes support holes 2f and 2g used to engage the rack 18.

The rack 18 includes a rack portion having a plurality of main rack teeth 18a, a pressing portion having a pressing section 18g that faces the rack portion and having a pressing tooth 18b, and opposing teeth 18c and 18d.

The pressing tooth 18b elastically holds the feed screw and has a tooth shape whose apical angle is larger than the angle of a root of the feed screw.

The rack 18 further includes shafts 18e (see FIG. 7A) and 18f to be engaged in the support holes 2f and 2g of the second lens support frame 2 and is attached to the second lens support frame 2 so as to be rotatable within a plane perpendicular to the optical axis.

The opposing teeth 18c and 18d are arranged outside the screw shaft 8a and do not engage with the screw shaft 8a, as illustrated in FIG. 6.

When a tooth skip will likely be caused by, for example, a shock in the main rack teeth 18a forming the rack portion, the tooth skip can be prevented from occurring in the rack 18 by the opposing teeth 18c and 18d coming into contact with the slope of a screw thread.

The pressing tooth 18b is elastically pressed by a portion 17a of the rack spring 17 in a direction in which the pressing tooth 18b is engaged with the screw shaft 8a. A portion 17b of the rack spring 17 is caught on a spring catching portion 18i of the rack 18.

Thus, the screw shaft 8a is sandwiched between the pressing tooth 18b and the main rack teeth 18a, and the main rack teeth 18a and the pressing tooth 18b always engage with the screw shaft 8a.

The rack spring 17 also elastically urges the rack 18 toward the end face in the optical-axis direction of the second lens support frame 2, thus preventing looseness that would be a problem in driving.

The screw shaft 8a, which is the output shaft of the zoom motor 8, is arranged in parallel or roughly parallel to the optical axis while being incorporated in the lens barrel.

In the state where the feed screw is incorporated, when the zoom motor 8 is actuated and the screw shaft 8a is rotated, the second lens support frame 2 is driven in the optical-axis direction.

Figure 7A:
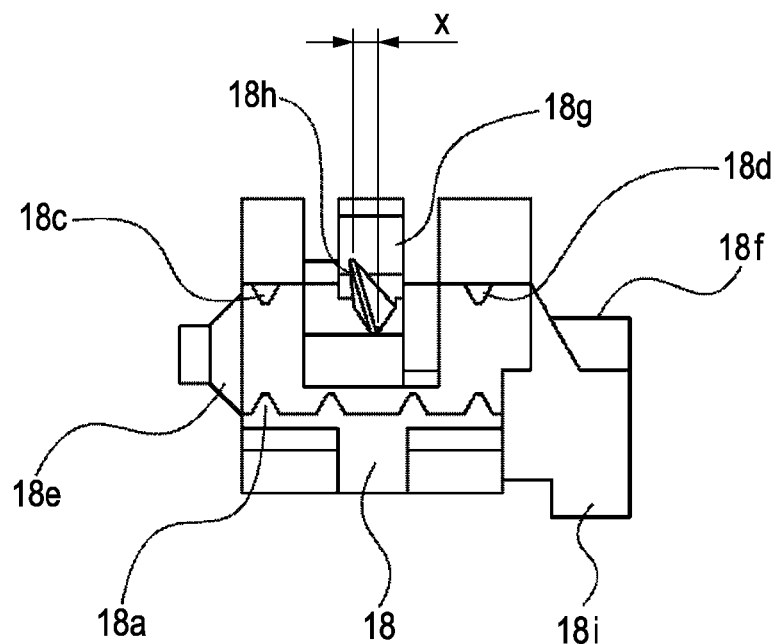
FIGS. 7A and 7B illustrate the rack according to a first embodiment.
Figure 7B:
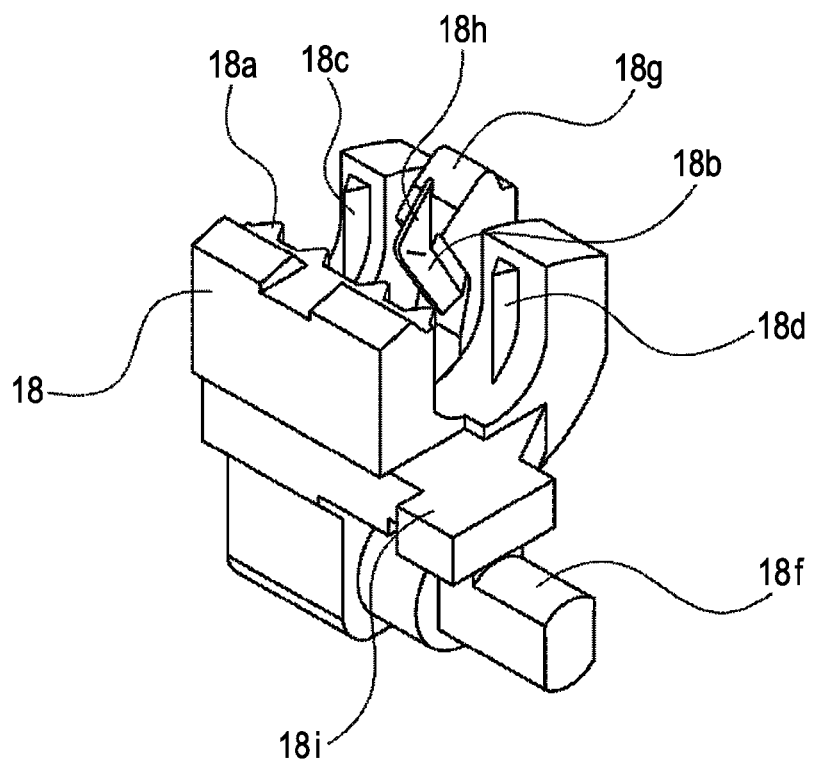

FIGS. 7A and 7B illustrate a shape of the rack 18 according to the first embodiment of the present invention; FIG. 7A illustrates the rack 18 seen from an opening side; and FIG. 7B is a perspective view thereof.

The rack 18 includes a tooth-shaped section 18h serving as a guiding section in a plane region that does not face the feed screw in an incorporated state. The tooth-shaped section 18h does not exist in a traditional example of a rack illustrated in FIG. 9. The tooth-shaped section 18h is continuous from the pressing tooth 18b.

Figure 9A:
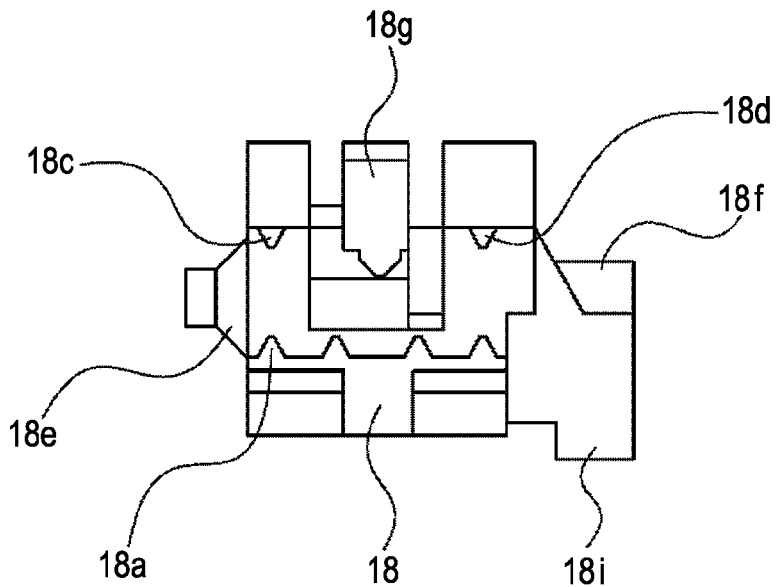
FIGS. 9A and 9B illustrate an example of a traditional rack.
Figure 9B:
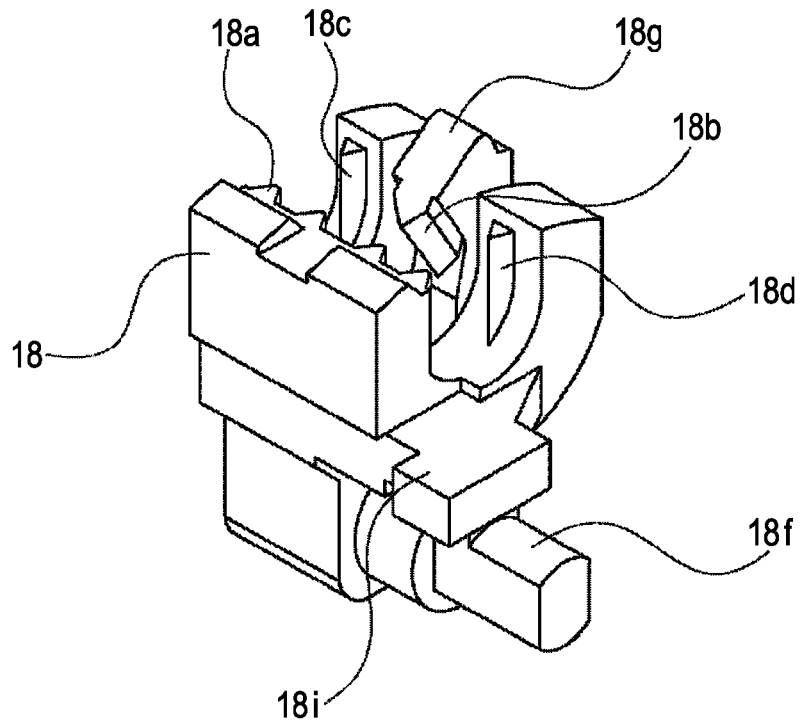

In the present embodiment, the same reference numerals are used as in the traditional example illustrated in FIG. 9 for elements having substantially the same configurations and functions.

Figure 10A:
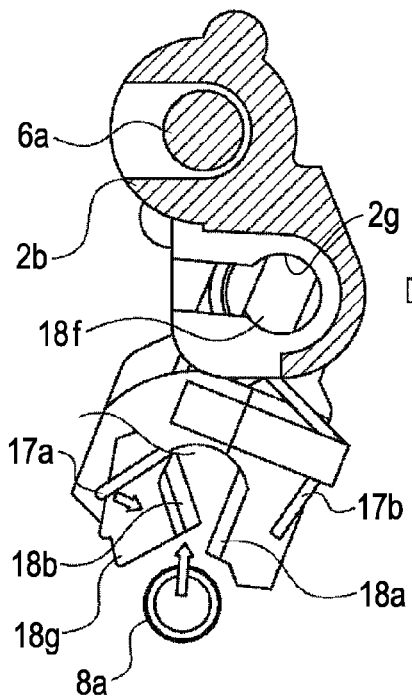
FIGS. 10A to 10E illustrate a process for incorporating the feed screw into the rack.
Figure 10B:
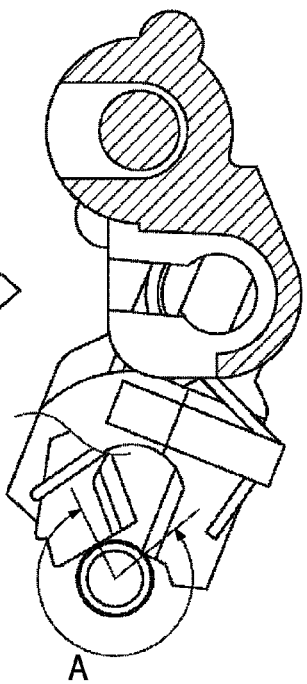

The tooth-shaped section 18h, which serves as a guiding tooth, is positioned so as to match with a screw root with which the pressing tooth 18b elastically holding the feed screw should engage in the state illustrated in FIG. 10B in an incorporating process illustrated in FIGS. 10A to 10E.

The angle of the engagement portion between the main rack tooth and the pressing tooth illustrated in FIG. 10B is represented by A. The angle of the engagement portion between the main rack tooth and the pressing tooth illustrated in FIG. 10E is represented by C.

The tooth-shaped section 18h, which serves as a guiding section, can be formed in a contact between the rack pressing portion and the feed screw illustrated in FIG. 10B such that the tooth-shaped section 18h is displaced from an extension line of the pressing tooth 18b by the amount (x in FIG. 7A) corresponding to (A−C)/360×screw lead L.

For example, when A is 280°, C is 150°, and L is 0.6 mm (double screw with a pitch of 0.3 mm), x is approximately 0.2 mm.

Figure 10C:
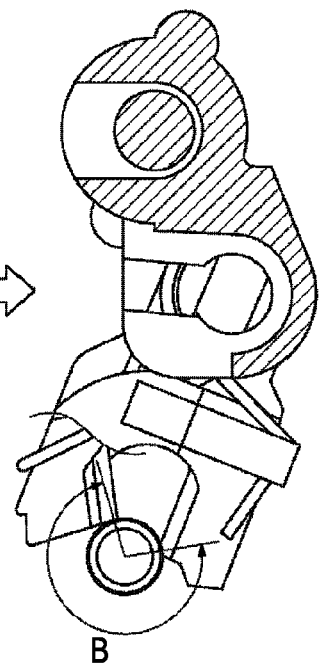
Figure 10D:
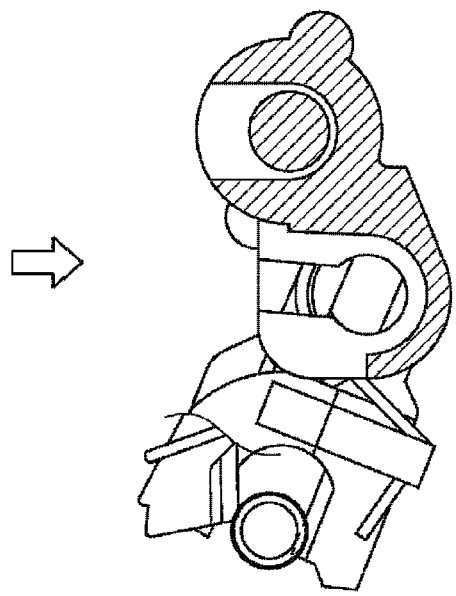
Figure 10E:
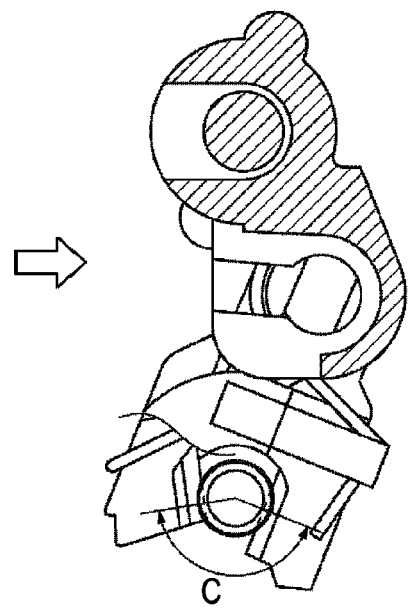

In such a way, after the tooth-shaped section 18h, which serves as a guiding tooth, engages with the feed screw in FIG. 10B, the state move from FIG. 10B to FIG. 10C to FIG. 10D to the FIG. 10E. In the state illustrated in FIG. 10E, where incorporation has been completed, the pressing tooth 18b is guided into a predetermined (regular) engagement position by engagement with the tooth-shaped section 18h, which serves as a guiding section.

This can prevent incorrect engagement in which the pressing tooth incorrectly engages in an adjacent root of the feed screw and which is a problem in a traditional example.

In the foregoing, the lens driving device for the second lens support frame 2 is described. The lens driving device for the fourth lens support frame 4 is similar to the above lens driving device.

In the present embodiment, the pressing tooth is angled to apply an urging force to the lens support frame. However, the pressing tooth may face the main rack tooth in parallel thereto without being angled.

Similar advantages are obtainable by application of the present invention as long as the pressing tooth is inclined inward by the rack spring.

In the present embodiment, the lens driving device is used for each of the second lens support frame 2 and the fourth lens support frame 4. However, any unit is selectable which uses the lens driving device. For example, the lens driving device can be used for only the second lens support frame 2.

Figure 2:
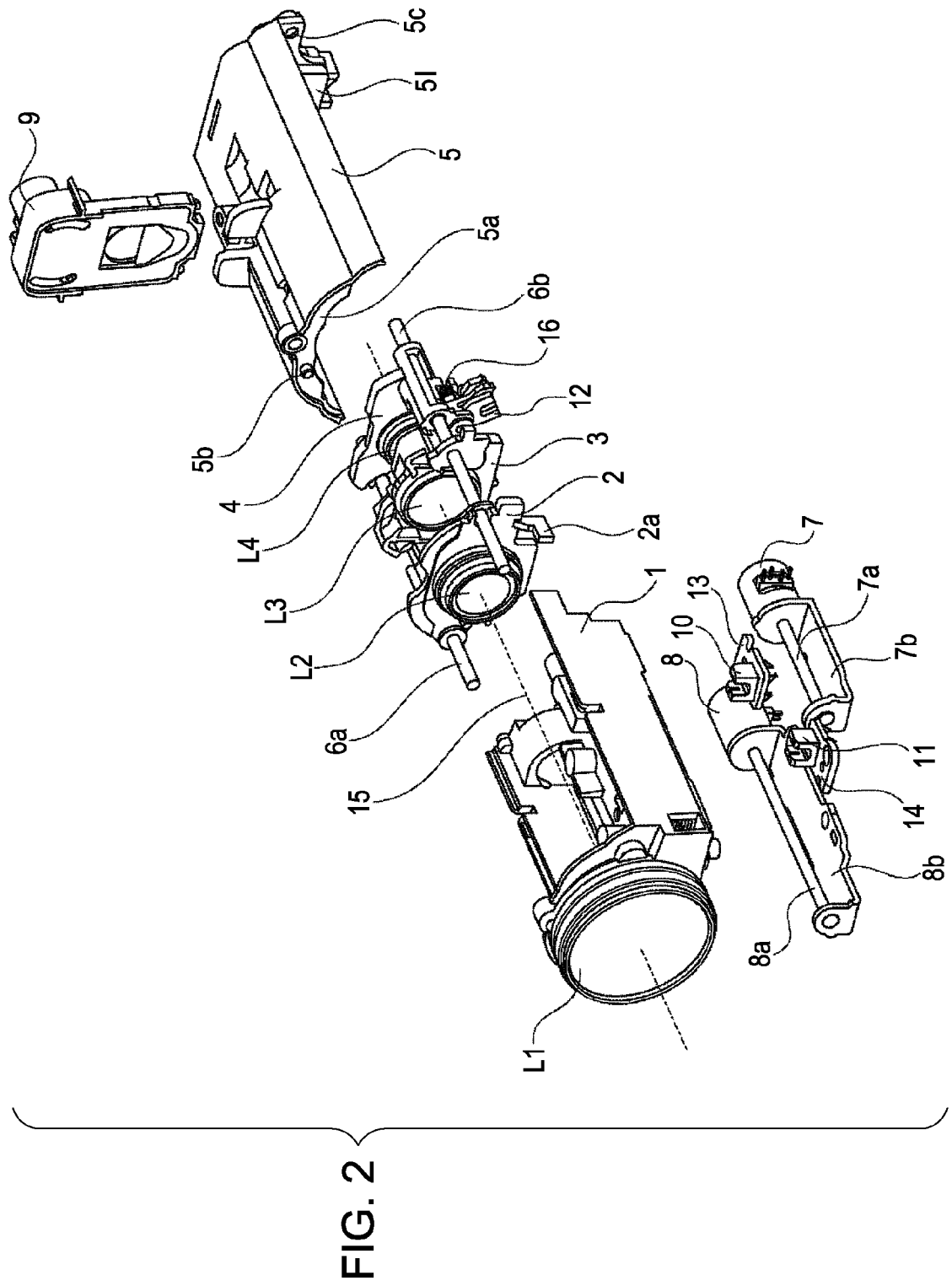
FIG. 2 is an exploded perspective view of the lens barrel according to an embodiment of the present invention.
Figure 13:
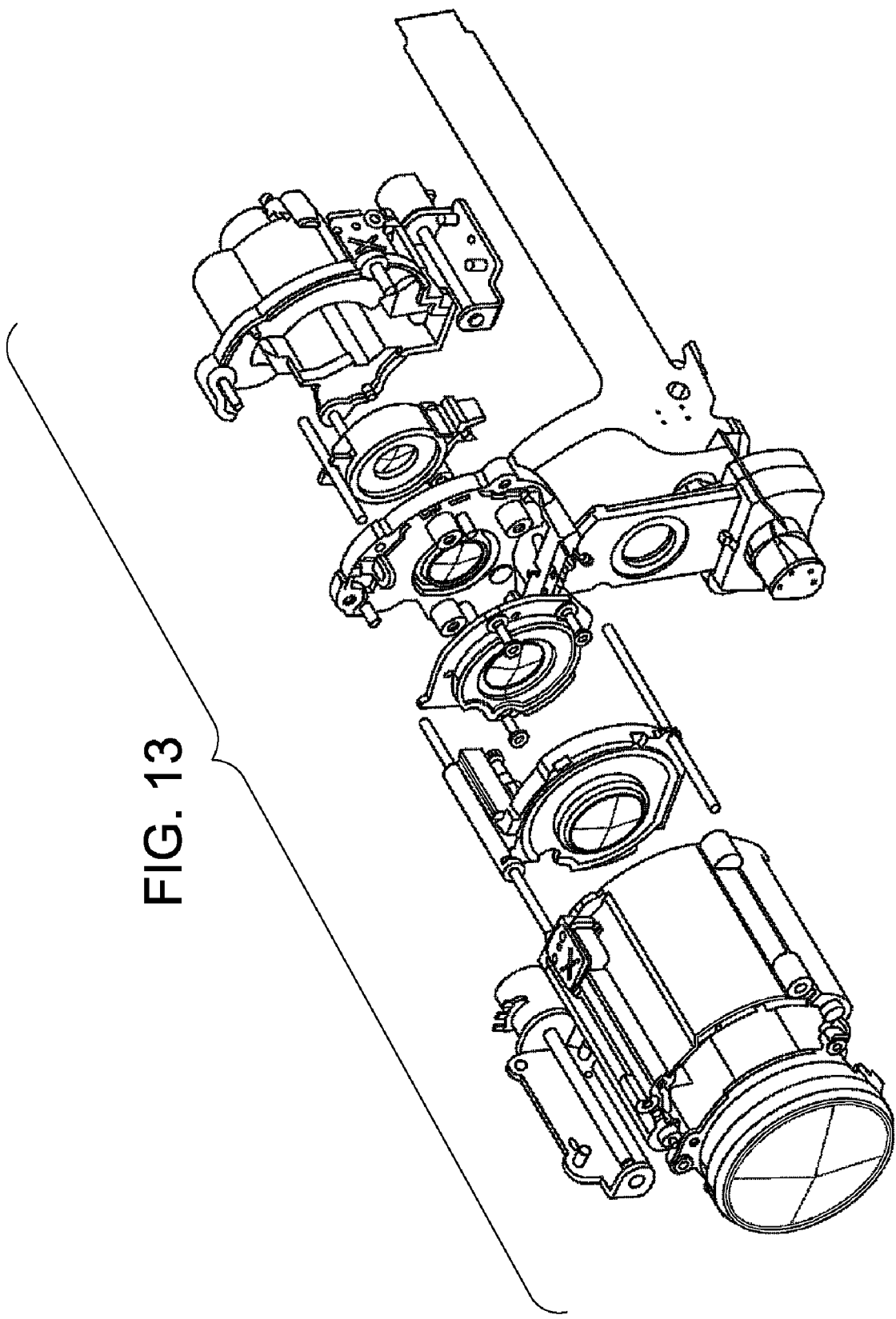
FIG. 13 is an exploded perspective view of a lens barrel including the lens driving device according to one of the embodiments and having a configuration different from the lens barrel illustrated in FIG. 1.

The use of the lens driving device according to the present embodiment is not limited to use in a lens barrel having the structure illustrated in FIG. 2. For example, the lens driving device can also be used in a lens barrel having the structure illustrated in FIG. 13 or another structure.

Figure 14:
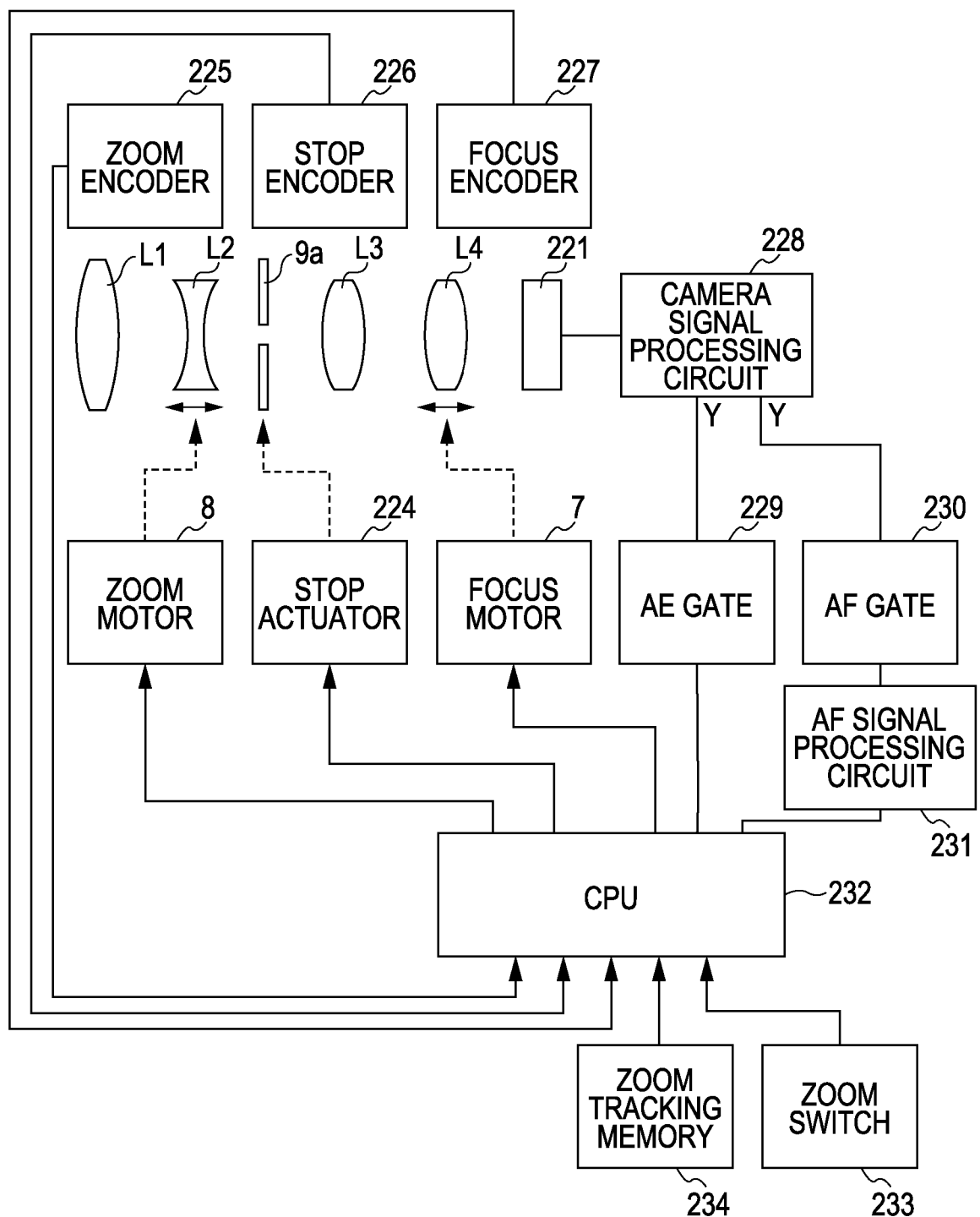
FIG. 14 is a block diagram that illustrates an electric-circuit configuration of a camcorder in which the lens barrel according to one of the embodiments is mounted.

FIG. 14 illustrates an electrical configuration of an image pickup apparatus (camcorder) serving as an optical apparatus that includes a lens barrel according to the present embodiment.

In this drawing, the same reference numerals are used as in those described above for the same elements, and the same description is not repeated here.

The image pickup apparatus includes an image sensor 221 (e.g., a CCD) supported by the rear barrel section 5.

The image pickup apparatus further includes a stop actuator 224 provided in the light-quantity adjusting unit 9. The stop actuator 224 drives the aperture blade 9a.

The image pickup apparatus also includes a zoom encoder 225 and a focus encoder 227.

The zoom encoder 225 detects the absolute position of the second lens unit L2 in the optical-axis direction. The focus encoder 227 detects the absolute position of the fourth lens unit L4 in the optical-axis direction.

When a stepping motor is used as each of the focus motor 7 and the zoom motor 8, as in the present embodiment, a light-shielding plate is integrally formed with a moving barrel section and a datum point is detected by the above-described photo-interrupter 10 or 11.

After that, the absolute position of the lens unit can be detected by counting of the number of driving pulses provided to the stepping motor.

However, an actuator other than such a stepping motor can also be used as the focus motor 7 and the zoom motor 8. Examples include a direct-current (DC) motor, a voice coil motor, a vibrating motor, and a vibrating linear actuator.

When a DC motor is used, an absolute-position encoder employing a volume or a magnetic encoder can be used as the encoder.

The image pickup apparatus further includes a stop encoder 226. One in which a Hall element is arranged inside the stop actuator 224 and that detects the rotary positional relationship between a rotor and a stator can be used as the stop encoder 226.

The image pickup apparatus also includes a camera signal processing circuit 228. The camera signal processing circuit 228 can perform predetermined amplification and gamma correction on an output of the image sensor 221.

A contrast signal of an image signal subjected to these predetermined processes passes through an autoexposure (AE) gate 229 and an autofocus (AF) gate 230.

That is, the range for extracting a signal optimal for exposure-determining and focusing within an imaging range is set by the AE gate 229 and the AF gate 230.

The range for extracting a signal set by the AE gate 229 and the AF gate 230 may be variable or made up of a plurality of ranges.

The image pickup apparatus further includes an AF signal processing circuit 231. The AF signal processing circuit 231 generates one or more AF evaluated value signals relating to a radio-frequency component of an image signal.

The image pickup apparatus also includes a zoom switch 233. In response to an operation on the zoom switch 233, a zoom signal is output.

The image pickup apparatus further includes a zoom tracking memory 234. The zoom tracking memory 234 stores data for use in zooming about a correction position for an image plane variation in the fourth lens unit L4 in accordance with the object distance and the position of the second lens unit L2.

The zoom tracking memory 234 may be disposed within a central processing unit (CPU) 232, which is described below.

The CPU 232 serves as a controller for controlling the entire image pickup apparatus.

When a zoom signal is input into the CPU 232 in response to an operation on the zoom switch 233, the CPU 232 controls the zoom motor 8 so as to move the second lens unit L2.

At the same time, the CPU 232 calculates the correction position for an image plane variation of the fourth lens unit L4 on the basis of the data stored in the zoom tracking memory 234 and controls the focus motor 7 such that the fourth lens unit L4 is moved to the correction position for the image plane variation.

In autofocusing, the CPU 232 controls the focus motor 7 such that an AF evaluated value signal from the AF signal processing circuit 231 peaks and the fourth lens unit L4 is moved.

Additionally, to acquire correct exposure, the CPU 232 controls the stop actuator 224 such that the mean value of output Y signals that passed through the AE gate 229 is a predetermined value and adjusts the aperture diameter of the light-quantity adjusting unit 9.

The camcorder is illustrated in FIG. 14. However, the lens driving device according to the present invention can also be used in other optical apparatuses, such as a digital still camera, a film camera, and an interchangeable lens.

The first exemplary embodiment of the present invention is described above. However, the present invention is not limited to this embodiment. Various modifications and changes can be made within the scope of the present invention.

The second embodiment of the present invention will be described below.

The configuration of the lens barrel, the configuration of the lens driving device, and the electrical configuration of the image pickup apparatus (camcorder) as the optical apparatus including the lens barrel according to the present embodiment are substantially the same as in the first embodiment.

Here, a rack different from that in the first embodiment is described in detail with reference mainly to FIGS. 8A and 8B.

Figure 8A:
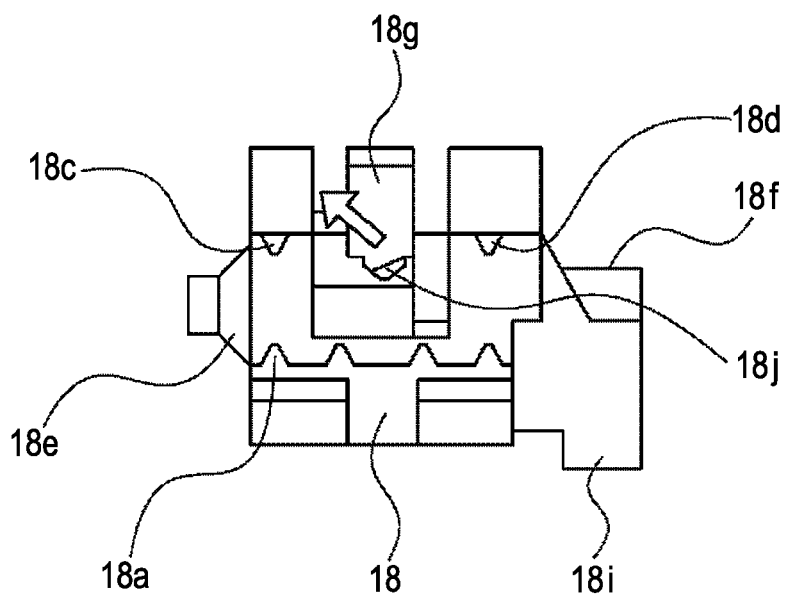
FIGS. 8A and 8B illustrate the rack according to a second embodiment.
Figure 8B:
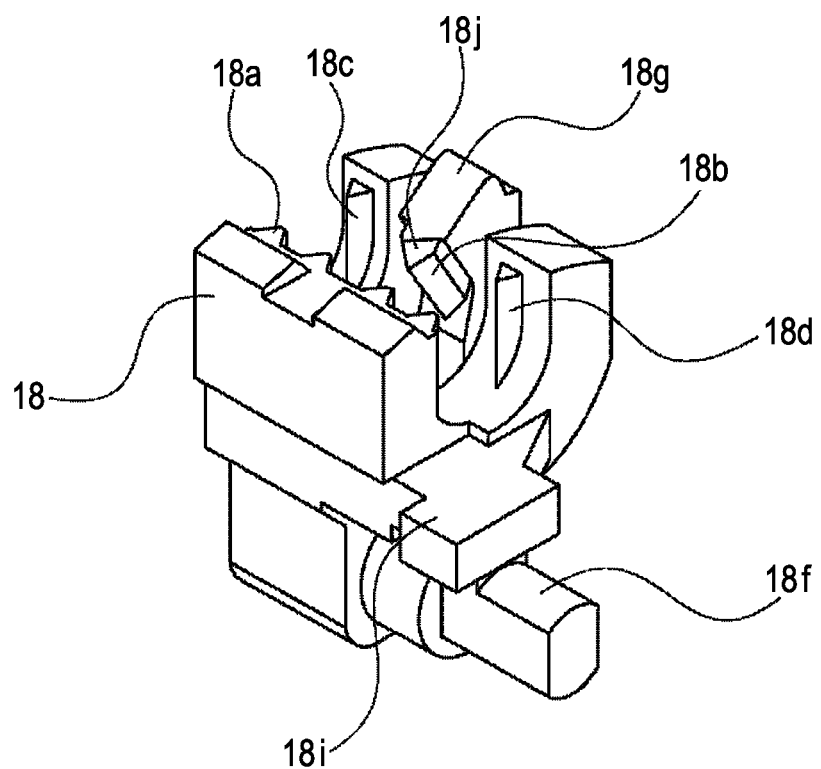

In the second embodiment illustrated in FIGS. 8A and 8B, the same reference numerals are used as in the first embodiment illustrated in FIGS. 7A and 7B for elements having the same configurations and functions.

FIGS. 8A and 8B illustrate a rack forming the driving device for the second lens support frame 2 in the lens barrel according to the present embodiment.

FIG. 8A illustrates the rack from an opening side; FIG. 8B is a perspective view thereof.

In the drawings, the rack includes a slope 18*j* serving as a guiding section. The slope 18*j* is disposed adjacent to the pressing tooth in the pressing portion 18*g*.

Figure 11:
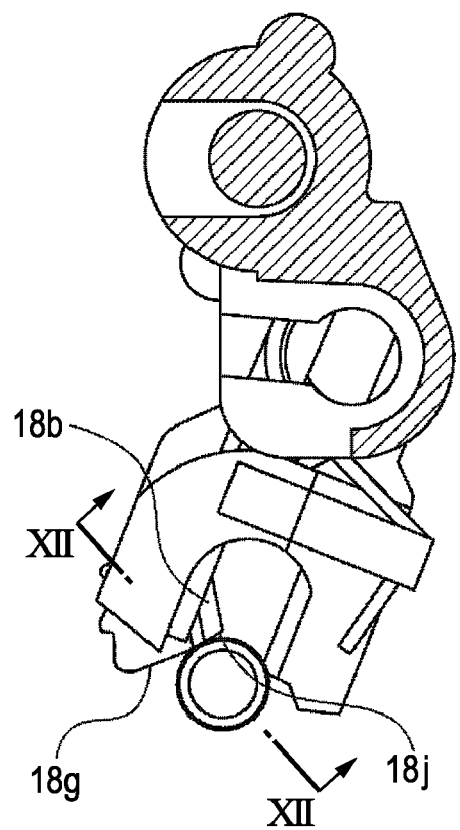
FIG. 11 illustrates a stage in a process for incorporating the feed screw into the rack according to the second embodiment.

FIG. 11 illustrates a stage in an incorporating process according to the second embodiment. At the stage, the outside of the feed screw starts coming into contact with the slope 18*j*.

Figure 12:
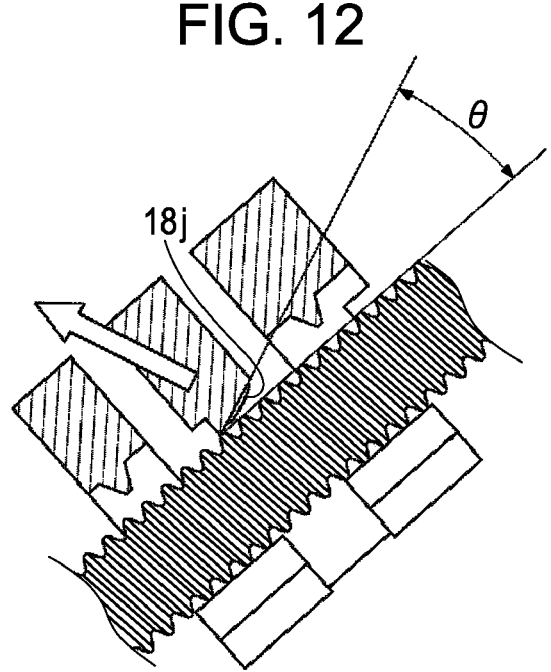
FIG. 12 is a cross-sectional view of the rack according to the second embodiment.

FIG. 12 is a cross-sectional view taken along the line XII-XII of FIG. 11. As illustrated in this drawing, the slope 18*j* is tilted at a predetermined angle of θ to the outside of the feed screw.

When the feed screw comes into contact with the slope 18*j*, a force is applied in the direction of the arrow illustrated in the drawing and the pressing portion 18*g* is pressed toward that direction.

In the traditional example, a problem is present in which the pressing tooth 18*b* illustrated in FIG. 10C enters an incorrect root of the feed screw that is adjacent to the root with which the pressing tooth should engage.

In contrast, in the second embodiment, the pressing portion 18*g* moves in the direction of the arrow before the pressing tooth 18*b* engages with the feed screw. Accordingly, the pressing tooth 18*b* is guided into a root with which the pressing tooth 18*b* should engage. Therefore, the traditional example problem, in which the pressing tooth engages with an incorrect adjacent root of the feed screw, can be prevented.

The tilt angle θ of the slope 18*j*, serving as a guiding section, in the line XII-XII can be set at an angle that allows the pressing tooth 18*b* to be moved by an amount necessary to be guided to the position of a predetermined (regular) root in accordance with a lead (pitch) of the feed screw.

In the foregoing, the lens driving device for the second lens support frame 2 is described. The lens driving device for the fourth lens support frame 4 is similar to the above lens driving device.

In the present embodiment, the pressing tooth is angled to apply an urging force to the lens support frame. However, the pressing tooth may face the main rack tooth in parallel thereto without being angled.

Similar advantages are obtainable by application of the present invention as long as the pressing tooth is inclined inward by the rack spring.

In the present embodiment, the lens driving device is used for each of the second lens support frame 2 and the fourth lens support frame 4. However, any unit is selectable which uses the lens driving device. For example, the lens driving device can be used for only the second lens support frame 2.

The use of the lens driving device according to the present embodiment is not limited to use in a lens barrel having the structure illustrated in FIG. 2. For example, the lens driving device can also be used in a lens barrel having the structure illustrated in FIG. 13 or another structure.

The second exemplary embodiment of the present invention is described above. However, the present invention is not limited to this embodiment. Various modifications and changes can be made within the scope of the present invention.

In the first and second embodiments, the tooth-shaped section 18*h* or the slope 18*j* is disposed in the pressing portion 18*g*. However, alternatively, the tooth-shaped section 18*h* or the slope 18*j* may be disposed in the main rack tooth 18*a* of the rack portion. Alternatively, the tooth-shaped section 18*h* or the slope 18*j* may be disposed in both of the pressing portion 18*g* and the main rack tooth 18*a* of the rack portion.

The configuration of the lens barrel illustrated in FIGS. 1 to 12 is merely examples. Various modifications and changes can be made within the scope of the claims.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-050125 filed Feb. 29, 2008, which is hereby incorporated by reference herein in its entirety.

What is claimed is:

1. A lens driving device comprising:
   a lens supporting portion configured to support a lens;
   a driving unit including a feed screw configured to transfer a driving force for driving the lens supporting portion in an optical-axis direction; and
   a rack supported by the lens supporting portion and engaging with the feed screw,
   wherein the rack includes a rack portion and a pressing portion facing the rack portion, the rack portion having a plurality of teeth engaging with the feed screw, the pressing portion having a pressing tooth elastically holding the feed screw,
   wherein at least one of the pressing portion and the rack portion has a guiding section for guiding the pressing tooth to a predetermined engagement position of the feed screw,
   wherein the pressing portion has the guiding section,
   wherein the guiding section is a slope adjacent to the pressing tooth at a surface that does not face the feed screw in a state where the guiding section engages with the feed screw.

2. A lens barrel comprising:
   a lens driving device including,
      a lens supporting portion configured to support a lens;
      a driving unit including a feed screw configured to transfer a driving force for driving the lens supporting portion in an optical-axis direction; and
      a rack supported by the lens supporting portion and engaging with the feed screw,
      wherein the rack includes a rack portion and a pressing portion facing the rack portion, the rack portion having a plurality of teeth engaging with the feed screw, the pressing portion having a pressing tooth elastically holding the feed screw,
      wherein at least one of the pressing portion and the rack portion has a guiding section for guiding the pressing tooth to a predetermined engagement position of the feed screw,
      wherein the pressing portion has the guiding section,
      wherein the guiding section is a slope adjacent to the pressing tooth at a surface that does not face the feed screw in a state where the guiding section engages with the feed screw; and
   a lens.

3. An optical apparatus comprising:
   a lens barrel including,
      a lens driving device including,
         a lens supporting portion configured to support a lens;
         a driving unit including a feed screw configured to transfer a driving force for driving the lens supporting portion in an optical-axis direction; and
         a rack supported by the lens supporting portion and engaging with the feed screw,
         wherein the rack includes a rack portion and a pressing portion facing the rack portion, the rack portion having a plurality of teeth engaging with the feed screw, the pressing portion having a pressing tooth elastically holding the feed screw,
         wherein at least one of the pressing portion and the rack portion has a guiding section for guiding the pressing tooth to a predetermined engagement position of the feed screw,
         wherein the pressing portion has the guiding section,
         wherein the guiding section is a slope adjacent to the pressing tooth at a surface that does not face the feed screw in a state where the guiding section engages with the feed screw; and
   a lens.

4. A method for assembling a lens driving device including a lens supporting portion configured to support a lens, a driving unit including a feed screw configured to transfer a driving force for driving the lens supporting portion in an optical-axis direction, and a rack supported by the lens supporting portion and engaging with the feed screw, wherein the rack includes a rack portion and a pressing portion facing the rack portion, the rack portion having a plurality of teeth engaging with the feed screw, the pressing portion having a pressing tooth elastically holding the feed screw, wherein at least one of the pressing portion and the rack portion has a guiding section for guiding the pressing tooth to a predetermined engagement position of the feed screw, wherein the pressing portion has the guiding section, wherein the guiding section is a slope adjacent to the pressing tooth at a surface that does not face the feed screw in a state where the guiding section engages with the feed screw, the method comprising:
   in incorporating the feed screw into the rack while pressing the feed screw against the pressing portion, guiding the pressing tooth to a predetermined engagement position of the feed screw using the guiding section.

5. A lens driving device comprising:
   a lens supporting portion configured to support a lens;
   a driving unit including a feed screw configured to transfer a driving force for driving the lens supporting portion in an optical-axis direction; and
   a rack supported by the lens supporting portion and engaging with the feed screw,
   wherein the rack includes a rack portion and a pressing portion facing the rack portion, the rack portion having a plurality of teeth engaging with the feed screw, the pressing portion having a pressing tooth elastically holding the feed screw,
   wherein the pressing portion has a guiding section for guiding the pressing tooth wherein the pressing portion has the guiding section,
   wherein the guiding section is a slope adjacent to the pressing tooth at a surface that does not face the feed screw in a state where the guiding section engages with the feed screw.

6. A lens barrel comprising:
   a lens driving device including,
      a lens supporting portion configured to support a lens;
      a driving unit including a feed screw configured to transfer a driving force for driving the lens supporting portion in an optical-axis direction; and
      a rack supported by the lens supporting portion and engaging with the feed screw,
      wherein the rack includes a rack portion and a pressing portion facing the rack portion, the rack portion having a plurality of teeth engaging with the feed screw, the pressing portion having a pressing tooth elastically holding the feed screw,
wherein the pressing portion has a guiding section for guiding the pressing tooth wherein the pressing portion has the guiding section, and
wherein the guiding section is a slope adjacent to the pressing tooth at a surface that does not face the feed screw in a state where the guiding section engages with the feed screw; and
a lens.

7. An optical apparatus comprising:
a lens barrel including,
   a lens driving device including,
      a lens supporting portion configured to support a lens;
      a driving unit including a feed screw configured to transfer a driving force for driving the lens supporting portion in an optical-axis direction; and
      a rack supported by the lens supporting portion and engaging with the feed screw,
      wherein the rack includes a rack portion and a pressing portion facing the rack portion, the rack portion having a plurality of teeth engaging with the feed screw, the pressing portion having a pressing tooth elastically holding the feed screw,
      wherein the pressing portion has a guiding section for guiding the pressing tooth wherein the pressing portion has the guiding section,
      wherein the guiding section is a slope adjacent to the pressing tooth at a surface that does not face the feed screw in a state where the guiding section engages with the feed screw; and
   a lens.

8. A method for assembling a lens driving device including a lens supporting portion configured to support a lens, a driving unit including a feed screw configured to transfer a driving force for driving the lens supporting portion in an optical-axis direction, and a rack supported by the lens supporting portion and engaging with the feed screw, wherein the rack includes a rack portion and a pressing portion facing the rack portion, the rack portion having a plurality of teeth engaging with the feed screw, the pressing portion having a pressing tooth elastically holding the feed screw, wherein the pressing portion has a guiding section for guiding the pressing tooth to a predetermined engagement position of the feed screw, and wherein the guiding section is a slope adjacent to the pressing tooth at a surface that does not face the feed screw in a state where the guiding section engages with the feed screw, the method comprising:
   in incorporating the feed screw into the rack while pressing the feed screw against the pressing portion, guiding the pressing tooth to a predetermined engagement position of the feed screw using the guiding section.

* * * * *